DE-EMPHASIS NETWORK FOR FM RADIOS
Filed June 1, 1965
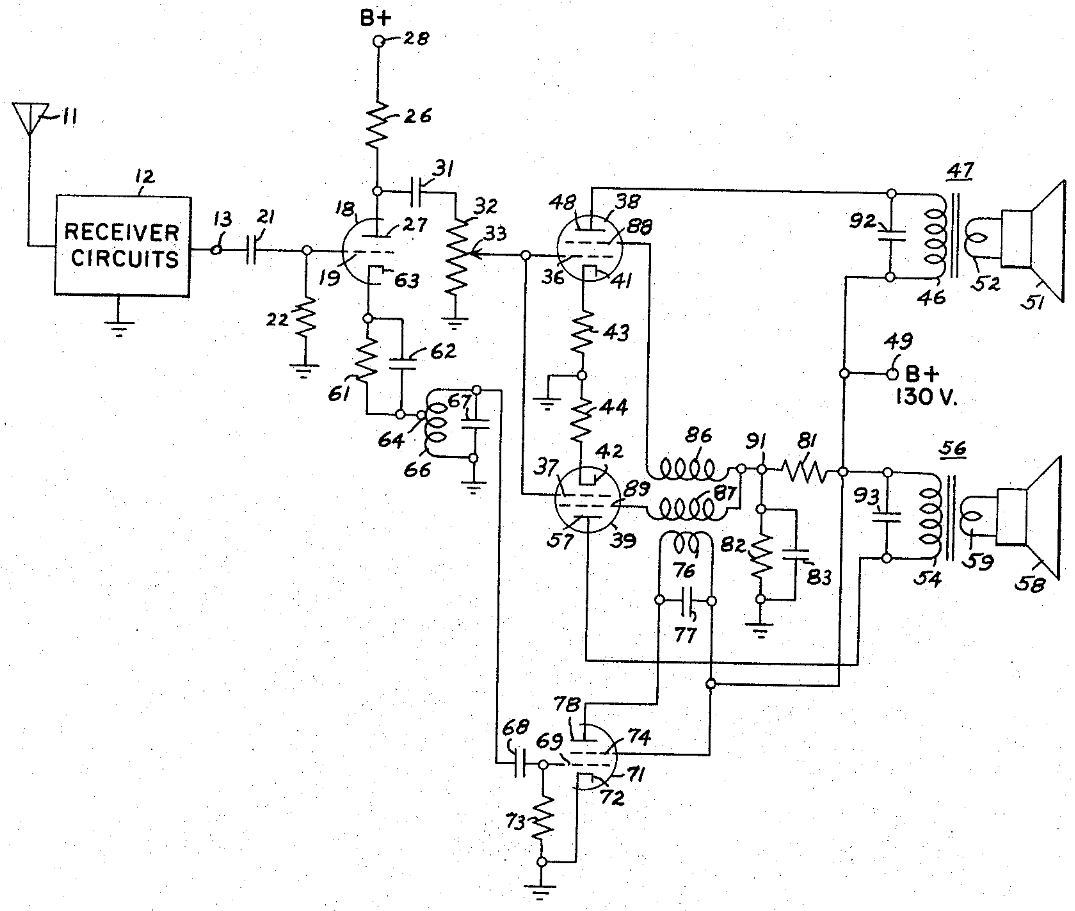
INVENTORS:
ANTAL CSICSATKA,
ROBERT M. LINZ,
BY Norman C. Fulmer
THEIR ATTORNEY.

3,339,026

DE-EMPHASIS NETWORK FOR FM RADIOS

Antal Csicsatka and Robert M. Linz, Utica, N.Y., assignors to General Electric Company, a corporation of New York Filed June 1, 1965, Ser. No. 460,459
1 Claim. (Cl. 179—15)

ABSTRACT OF THE DISCLOSURE

A de-emphasis network for a FM stereo receiver of the time sampling type having a capacitor connected across the primary of the output transformer in each channel to provide both de-emphasis and integration of the time-sampled stereo outputs.

This invention relates to de-emphasis networks for use in FM radio reception circuits. The invention also relates to integrating networks for use in stereophonic FM reception circuits of the time-sampling type.

In FM (frequency modulation) broadcasting, it is customary at the transmitter to pre-emphasize the audio signal, i.e. to relatively boost the amplitude of the higher audio frequencies. Correspondingly, in the receivers it is customary to de-emphasize the audio signal in a manner converse to the pre-emphasis characteristic, to obtain a net result of a "flat" frequency response characteristic. The purpose of the pre-emphasis and de-emphasis is to improve the signal-to-noise ratio at the higher audio frequencies. In FM stereo systems, pre-emphasis and de-emphasis are employed for each of the "left" and "right" stereo audio signals. The present invention will be described as applied to a stereophonic receiver circuit of the time-sampling type.

An object of the invention is to provide an improved de-emphasis network for FM radio circuits.

Another object is to provide a de-emphasis network which is low in cost and which functions effectively.

A further object is to provide a de-emphasis network for use in time-sampling stereophonic reception circuits, which network also functions as an integrating network for pulsed stereo audio signals.

Other objects will be apparent from the following description and claim, and from the accompanying drawing.

The improved de-emphasis network of the invention comprises, briefly and in a preferred embodiment, a capacitor connected across the winding of an audio signal transformer at the output of a stereo switching device, the capacitor having a value of capacitance in relation to the output impedance of the switching device and the effective impedance of the transformer winding so as to provide proper de-emphasis of pre-emphasized audio signals. For stereo reception, the invention comprises a time-sampling circuit in which the output audio amplifier device of each stereo channel is alternatively switched on and off to provide time-sampling of the stereo composite signal, and capacitors are respectively connected in parallel with primary windings of audio output transformers which are respectively connected to output electrodes of the output audio amplifier devices, these capacitors having values of capacitance with respect to the associated output impedance of the switching device and the effective impedance of the primary winding to provide de-emphasis of the pre-emphasized stereo audio signals and also to integrate the time-sampled pulses of stereo signal information.

In the drawing, the single figure is an electrical schematic diagram of a preferred embodiment of the invention.

An antenna 11 picks up the standard FM stereo signal in conventional manner, and applies it to receiver circuits 12 which normally include, for reception of FM signals, a mixer circuit, intermediate frequency stages, and a demodulator of the limiter-discriminator type or ratio-detector type. The output of the receiver circuits 12 at the output terminal 13 thereof comprises the composite stereo signal in the form of an $L+R$ ("left" plus "right" stereo signals) component in a frequency range of some 50 to 15,000 cycles per second, a pilot signal at 19 kc. per second, and L–R sidebands of a suppressed amplitude modulated subcarrier, these sidebands extending between 23 kc. per second and 53 kc. per second.

An amplifier device 18, which is shown as comprising a vacuum tube, has a grid input electrode 19 connected via a coupling capacitor 21 to the terminal 13. A resistor 22 is connected between the grid 19 and electrical ground. A resistor 26 is connected between the anode 27 of tube 18 and a terminal 28 of operating voltage. A coupling capacitor 31 is connected between the anode 27 and one end of a volume control potentiometer 32, the other end thereof being electrically grounded. An adjustable tap 33 of the volume control 32 is connected to input grid electrodes 36 and 37 of a pair of screen grid amplifier tubes 38 and 39. The cathodes 41 and 42 of these amplifier tubes are respectively connected to electrical ground via biasing resistors 43 and 44. The tubes 38 and 39 respectively constitute time-sampling switching devices for deriving the left and right stereo signals from the incoming composite signal, and also amplify the derived left and right signals.

A primary winding 46 of an output transformer 47 is connected between the anode 48 of tube 38 and a terminal 49 of suitable operating voltage for the tubes 38 and 39. A loudspeaker 51, which may be for reproduction of the "left" output signal, is connected to a secondary winding 52 of audio output transformer 47. Similarly, a primary winding 54 of an output transformer 56 in the other channel is connected between the voltage terminal 49 and the anode 57 of the tube 39, and a loudspeaker 58, which may be for the "right" stereo signal, is connected to a secondary winding 59 of the audio output transformer 56.

A resistor 61 and capacitor 62 are connected in parallel between the cathode 63 of the composite signal amplifier tube 18 and a tap 64 of an inductor 66. A capacitor 67 is connected in parallel with the inductor 66, to provide therewith a resonant circuit tuned to the 19 kc. frequency of the pilot signal, thereby to select the pilot signal from the other components of the stereo composite signal. An end of the inductor 66 is electrically grounded, and the other end is coupled via a capacitor 68 to an input grid 69 of a frequency-doubler tube 71. The cathode 72 of tube 71 is electrically grounded, and a resistor 73 is connected between the grid 69 and electrical ground. A screen grid 74 is connected to the voltage terminal 49, and an inductor 76 and capacitor 77 are connected in parallel between the screen grid 74 and the anode 78 of the frequency-doubler tube 71. The inductor 76 and capacitor 77 constitute a resonant circuit tuned to be resonant at the 38 kc. frequency of the sideband reference waves, and the tube 71 functions to amplify the 19 kc. pilot signal and apply it to the 38 kc. resonant circuit 76–77, whereupon a 38 kc. reference wave or switching signal becomes generated in the resonant circuit 76–77.

A pair of resistors 81 and 82 are connected in series between the voltage terminal 49 and electrical ground, and a filter capacitor 83 is connected across the resistor 82.

Secondary windings 86 and 87 are respectively connected between the screen grids 88 and 89 of the amplifier output tubes 38 and 39, and the junction 91 of the voltage-dropping resistors 81 and 82. In effect, these windings 86 and 87 are a single center-tapped winding. The voltage-dropping resistors 81 and 82 provide, at the junction terminal 91, a voltage value approximately halfway between the screen grid voltage value for full amplification by the tubes 38 and 39, and for no amplification by these tubes. The secondary windings 86 and 87 are inductively coupled to the 38 kc. resonant circuit inductor 76, thereby to apply to the screen grids 88 and 89 oppositely phased 38 kc. switching signals of sufficient amplitude to alternately apply voltages to these screen grids to drive the switching and amplifying tubes 38 and 39 alternately to full amplification condition and to no amplification or cut-off condition at a 38 kc. rate, whereupon one of the stereo signals, for example the L signal, is derived by the switching action of tube 38, amplified, and applied to the output transformer 47 and loudspeaker 51. Similarly, the switching action by tube 39 derives the other signals, for example the "right" signal, by the time-sampling process, from the composite signal, and amplified this right signal and applies it to the output transformer 56 and loudspeaker 58.

By well-known theory, this alternate switching of the stereo composite signal into two channels of output, when properly synchronized and phased by the 38 kc. switching signal with respect to the suppressed reference wave, will produce the left and right stereo output signals, as described. The network of resistor 61 and capacitor 62 improves the stereo signal separation by relatively increasing the amplitude of the L–R sidebands of the composite signal. The volume control 32 controls the amplitude of the L and R output signals.

The circuitry thus far described, is the subject of patent application Ser. No. 460,364 assigned to the same assignee as the present invention. If desired, other time-sampling circuitry can be employed.

In accordance with the present invention, capacitors 92 and 93 are respectively connected across the primary windings 46 and 54 of the audio output transformers 47 and 56, at the outputs of the amplifiers 38 and 39. These capacitors have values of capacitance, with respect to the effective impedance values of the primary windings 46 and 54 and with respect to the plate output impedances of the switching tubes 69 and 90, to constitute, in cooperation therewith, de-emphasis networks for reducing the relative amplitudes of the higher frequencies of the pre-emphasized L and R stereo audio signals. Standard de-emphasis is designated as 75 microseconds. In a practical circuit, suitable values for each of the capacitors 92 and 93 would be 0.01 microfarads. The amplifier tubes 69 and 90 being type 50C5 tubes each having an internal plate impedance of approximately 10,000 ohms. The effective impedances of the primary windings are affected by, and include the effects of, load impedances reflected through the transformers, and is 2,500 ohms in the example described.

Thus, per the invention, de-emphasis is achieved in each channel by adding a single capacitor to the circuit. This incurs about one-half the cost of the conventional de-emphasis network which requires two components, namely a resistor in series with the signal path followed by a capacitor in shunt with the signal path. Another advantage of the invention is that, by eliminating the usual de-emphasis series resistor in the signal path, the signal loss is eliminated which would be caused by this series resistor.

The value of capacitance required of the capacitors 92 and 93 for de-emphasis purposes is, when these capacitors are connected in the circuit as shown, more than required, and hence is adequate for, causing these capacitors (in conjunction with plate impedance of the amplifier tubes and impedance of the primary windings of the output transformers) to perform the additional function of integrating the pulsed L and R stereo signals produced by the switching tubes 38 and 39. This integration "smooths out" the pulses to provide "clean" audio signals. Stray or leakage inductance between the primary and secondary of the audio transformers 47 and 56, along with the capacitors 92 and 93, represent half-section low-pass filters which also are effective in integrating the pulses of stereo information.

From the foregoing, it is apparent that the invention achieves an improved low-cost de-emphasis network, an integrating network, and also a combined integrating and de-emphasis network.

While a preferred embodiment of the invention has been shown and described, various other embodiments and modifications thereof will be apparent to those skilled in the art and will fall within the scope of invention as defined in the following claim.

What we claim is:

Reception circuitry for pre-emphasized stereophonic audio signals, comprising a time-sampling swtiching device for deriving pulses of stereo signal information, said device having a signal output electrode at which said pulses are provided, said device having an inherent internal output impedance at said output electrode, an output transformer having a primary winding connected to said output electrode, said primary winding having an effective impedance value, and a capacitor connected across said primary winding, said capacitor having a value of capacitance with respect to said output impedance and the effective impedance of said primary winding so as to constitute therewith an integrating network for said pulses and also a de-emphasis network for said pre-emphasized stereophonic audio signals.

References Cited

UNITED STATES PATENTS

| | | | |
|---|---|---|---|
| 2,289,594 | 7/1942 | Schaper | 325—385 |
| 3,060,266 | 10/1962 | Dow | 179—1.3 |
| 3,175,040 | 3/1965 | Von Recklinghausen | 179—15 |
| 3,176,074 | 3/1965 | Browne | 179—15 |

JOHN W. CALDWELL, *Primary Examiner.*

ROBERT L. GRIFFIN, *Examiner.*